US010693319B2

(12) United States Patent
Hong et al.

(10) Patent No.: US 10,693,319 B2
(45) Date of Patent: Jun. 23, 2020

(54) WIRELESS CHARGING PAD INCLUDING PLURALITY OF SMALL POWER TRANSMISSION COILS AND DEVICE FOR AND METHOD OF DRIVING WIRELESS CHARGING PAD IN WIRELESS POWER TRANSMISSION SYSTEM

(71) Applicant: UNIVERSITY-INDUSTRY COOPERATION GROUP OF KYUNG HEE UNIVERSITY, Yongin-si, Gyeonggi-do (KR)

(72) Inventors: Een Kee Hong, Seongnam-si (KR); Joon Hwan Kim, Seoul (KR); Bom Son Lee, Yongin-si (KR); Gun Young Kim, Andong-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 67 days.

(21) Appl. No.: 15/902,543

(22) Filed: Feb. 22, 2018

(65) Prior Publication Data

US 2019/0165608 A1 May 30, 2019

(30) Foreign Application Priority Data

Nov. 24, 2017 (KR) .......................... 10-2017-0158841

(51) Int. Cl.
*H02J 50/10* (2016.01)
*H02J 50/90* (2016.01)
(Continued)

(52) U.S. Cl.
CPC .............. *H02J 50/10* (2016.02); *H02J 7/025* (2013.01); *H02J 50/40* (2016.02); *H02J 50/90* (2016.02);
(Continued)

(58) Field of Classification Search
CPC .. H02J 7/025; H02J 50/90; H02J 50/40; H02J 50/10; H02J 17/00; H02J 50/12; H02J 50/20; H04B 5/0087; H04B 5/0037
(Continued)

(56) References Cited

U.S. PATENT DOCUMENTS

| 2007/0182367 A1* | 8/2007 | Partovi | ................... H01F 5/003 |
| | | | 320/108 |
| 2011/0025133 A1* | 2/2011 | Sauerlaender | .......... H02J 5/005 |
| | | | 307/104 |

(Continued)

FOREIGN PATENT DOCUMENTS

| JP | 2014-527793 A | 10/2014 |
| JP | 2016-105690 A | 6/2016 |

(Continued)

*Primary Examiner* — Richard Isla
*Assistant Examiner* — Manuel Hernandez
(74) *Attorney, Agent, or Firm* — Sughrue Mion, PLLC

(57) ABSTRACT

Disclosed are a wireless charging pad including a plurality of small power transmission coils and a device for and a method of driving the wireless charging pad. More particularly, the wireless charging apparatus includes a driving controller configured to generate a first control signal so as to apply a first driving voltage having a first phase to power transmission coils to be driven matching a device to be charged among the small power transmission coils and generate a second control signal so as to apply a second driving voltage having a phase opposite to the first phase to power transmission coils surrounding the power transmission coils to be driven; and a coil driver configured to apply the first and second driving signals to a wireless charging pad.

7 Claims, 19 Drawing Sheets

(51) Int. Cl.
*H02J 7/02* (2016.01)
*H02J 50/40* (2016.01)
*H04B 5/00* (2006.01)

(52) U.S. Cl.
CPC ......... *H04B 5/0037* (2013.01); *H04B 5/0087* (2013.01)

(58) Field of Classification Search
USPC .......................................... 320/180; 307/104
See application file for complete search history.

(56) References Cited

U.S. PATENT DOCUMENTS

| | | | | |
|---|---|---|---|---|
| 2012/0007437 A1* | 1/2012 | Fells | ....................... | H01F 38/14 307/104 |
| 2013/0093253 A1* | 4/2013 | Norconk | ................. | H02J 5/005 307/104 |
| 2013/0119773 A1* | 5/2013 | Davis | ...................... | H02J 5/005 307/104 |
| 2015/0236526 A1* | 8/2015 | Jadidian | .................. | H02J 5/005 320/108 |
| 2017/0237296 A1* | 8/2017 | Keith | ...................... | H02J 50/12 307/104 |
| 2018/0097404 A1* | 4/2018 | Park | ........................ | H02J 50/12 |

FOREIGN PATENT DOCUMENTS

| | | |
|---|---|---|
| JP | 2017-511102 A | 4/2017 |
| KR | 10-2012-0117262 A | 10/2012 |
| KR | 10-2013-0026254 A | 3/2013 |
| KR | 10-2013-0119585 A | 11/2013 |
| KR | 10-2015-0055087 A | 5/2015 |
| KR | 10-2016-0147238 A | 12/2016 |
| KR | 10-2017-0010870 A | 2/2017 |
| WO | 2013/020138 A2 | 2/2013 |
| WO | 2015/123651 A1 | 8/2015 |

* cited by examiner (a)

(b)

))) Far Field WPT  ((📱)) RF Harvesting Device

⌒ Near Field WPT  📶 Communication Device

WIRELESS CHARGING PAD INCLUDING PLURALITY OF SMALL POWER TRANSMISSION COILS AND DEVICE FOR AND METHOD OF DRIVING WIRELESS CHARGING PAD IN WIRELESS POWER TRANSMISSION SYSTEM

CROSS-REFERENCE TO RELATED APPLICATION

This application claims the priority benefit of Korean Patent Application No. 10-2017-0158841, filed on Nov. 24, 2017 in the Korean Intellectual Property Office, the disclosure of which is incorporated herein by reference.

BACKGROUND OF THE DISCLOSURE

Field of the Disclosure

The present disclosure relates to a wireless power transmission system, and more particularly to a wireless charging pad including a plurality of small power transmission coils and a device for and a method of driving the wireless charging pad in a wireless power transmission system.

Description of the Related Art

Currently, wireless power transmission is widely spreading to mobile IoT, etc., starting with the charging of portable terminals, and becoming popularized, and consumer demand therefor is gradually increasing. Such wireless power transmission is a technique for supplying power between a transmitter and a receiver without using a wire, and is generally classified into three types of microwave, magnetic induction, and magnetic field resonance methods.

The microwave method using an electromagnetic radiation antenna has an advantage for a long-distance power transmission, but it exhibits a radio wave spreading phenomenon. Accordingly, the microwave method exhibits very low efficiency over a certain distance and, at high power, an area near a transmitter may harmfully affect the human body.

The magnetic induction method, as a contact-type wireless power transmission method which is currently used in wireless chargers, is advantageous in that power transmission efficiency is high over a very short distance of several millimeters and is harmless to the human body due to use of a magnetic field. However, the magnetic induction method is disadvantageous in that mobility of mobile devices is not guaranteed and efficiency is reduced even when the mobile devices are moved even by a small distance.

A wireless power transmission system adopting magnetic field resonance has been actively studied since Marin Solajacic's MIT team first proposed the same in 2007. This system uses a resonance phenomenon during transmission and reception, and is advantageous in that medium-distance transmission is possible. In addition, the system uses a magnetic field as in the magnetic induction method, thus being harmless to the human body.

Meanwhile, commercially available wireless charging apparatuses have a small pad shape, such as a smart phone, configured to charge one or two devices, or are provided as a space for charging on a certain portion of a table.

Since such wireless charging apparatuses have a size similar to a total area of coils that are configured to wirelessly transmit power, power loss may be reduced, but mobility may be limited.

Meanwhile, Korean Patent Publication Application No. 2012-0117262 (entitled "WIRELESS POWER TRANSMISSION DEVICE FOR VEHICLES CONFIGURED TO ALLOW POSITION ALIGNMENT OF COILS), as a related technology to the present disclosure, discloses a charging manner characterized by disposing a plurality of coils in a charging pad.

However, a wireless power transmission device according to the related technology does not have a configuration capable of efficiently controlling driving of coils. In addition, a manner of moving coils per se is disadvantageous in that an additional device, such as a motor, is required.

RELATED ART DOCUMENTS

Patent Documents

Korean Patent Publication Application No. 2012-0117262, entitled "Wireless power transmission device for vehicles configured to allow position alignment of coils.

SUMMARY OF THE DISCLOSURE

Therefore, the present disclosure has been made in view of the above problems, and it is one object of the present disclosure to provide a wireless power transmission system being capable of applied to complex wireless channel environments such as homes, offices, airports, and trains.

It is another object of the present disclosure to provide a wireless charging pad capable of addressing problems, such as limitation as to a charging location, a power loss problem, and limitation in the maximum number of chargeable devices, of existing wireless charging pads, and a device for and a method of driving the wireless charging pad.

In accordance with an aspect of the present disclosure, the above and other objects can be accomplished by the provision of a wireless charging apparatus including a plurality of small power transmission coils, wherein the wireless charging apparatus includes a driving controller configured to generate a first control signal so as to apply a first driving voltage having a first phase to power transmission coils to be driven matching a device to be charged among the small power transmission coils and generate a second control signal so as to apply a second driving voltage having a phase different from the first phase to power transmission coils surrounding the power transmission coils to be driven; and a coil driver configured to apply the first and second driving signals to a wireless charging pad.

In accordance with another aspect of the present disclosure, there is provided a driving device for a wireless charging pad including a plurality of small power transmission coils, the driving device including a first driving controller configured to each independently control driving of small power transmission coils of a first wireless charge module including the small power transmission coils; a second driving controller configured to each independently control driving of small power transmission coils of a second wireless charge module including the small power transmission coils; and a plurality of driving modules configured to respectively drive the small power transmission coils of the first and second wireless charge modules according to a first or second control signal input from the first and second driving controllers.

In accordance with yet another aspect of the present disclosure, there is provided a method of driving a wireless charging pad including a plurality of small power transmission coils, the method including a coil driving determination step of investigating power transmission coils to be driven matching a device to be charged among the small power transmission coils and investigating power transmission coils surrounding the power transmission coils to be driven among the small power transmission coils; a control signal generation step of generating a first control signal to apply a first driving voltage having a first phase to the power transmission coils to be driven and generating a second control signal to apply a second driving voltage having a phase opposite to the first phase to the surrounding power transmission coils; and a driving signal application step of applying the first and second control signals to a wireless charging pad.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
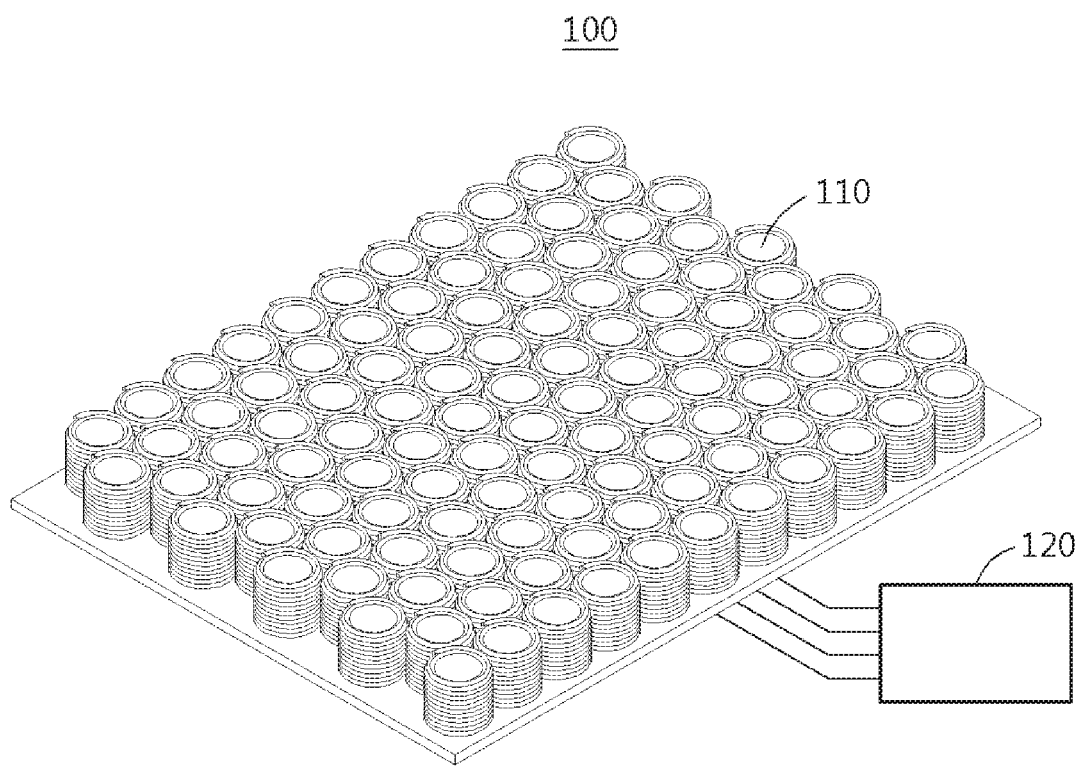
FIG. 1 is a drawing illustrating a configuration of a wireless charging apparatus including a wireless charging pad constituted of a plurality of small power transmission coils according to an embodiment of the present disclosure.

Reference will now be made in detail to the embodiments, examples of which are illustrated in the accompanying drawings. However, the embodiments should not be construed as limited to the exemplary embodiments set forth herein.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the disclosure and the appended claims, the singular forms "a", "an" and "the" are intended to include the plural forms as well, unless context clearly indicates otherwise.

Further, terms such as "first" and "second" are used herein merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

A wireless charging apparatus according to an embodiment of the present disclosure is characterized in that several small power transmission coils are disposed in a tessellation structure on a charging pad, and thus, driving of the wireless charging apparatus is controlled such that, when one or more devices to be charged are placed on the charging pad, only coils under the devices are driven and the other coils are not driven, thereby preventing power dissipation and waste.

In addition, in the case of the wireless charging apparatus according to an embodiment of the present disclosure, a separate setting element, such as a shift register, is used to control respective coils, thereby effectively controlling driving of the wireless charging apparatus.

FIG. 1 is a drawing illustrating a configuration of a wireless charging apparatus including a wireless charging pad constituted of a plurality of small power transmission coils according to an embodiment of the present disclosure.

Referring to FIG. 1, a wireless charging apparatus 100 includes a wireless charging pad 110 and a device 120 for driving a wireless charging pad.

Accordingly, the wireless charging apparatus 100 may be referred to as "a wireless charging apparatus constituted of a plurality of small power transmission coils" in the specification.

Figure 3:
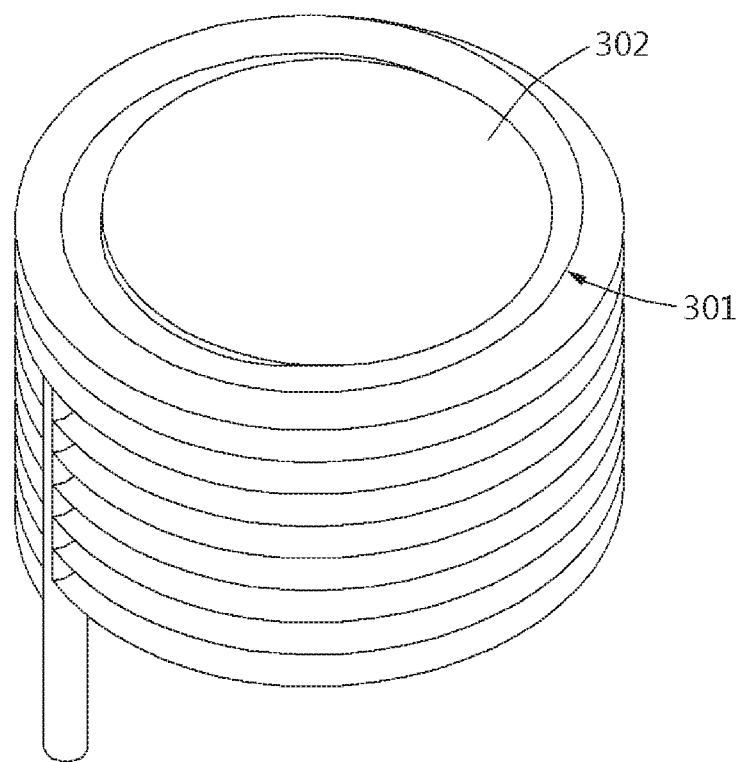
FIG. 3 is a drawing illustrating a constitution of a small power transmission coil according to an embodiment of the present disclosure.

The wireless charging pad 110 may include a plurality of small power transmission coils. Each of the small power transmission coils may be constructed as illustrated in FIG. 3.

Here, the small power transmission coils may be disposed in a tessellation structure, without overlapping each other, on the wireless charging pad 110. Accordingly, a maximum number of small power transmission coils may be disposed in a limited space.

The device 120 for driving a wireless charging pad may be implemented as an electronic circuit provided inside the wireless charging pad 110.

By the device 120 for driving a wireless charging pad, the small power transmission coils may be each independently driven.

Hereinafter, a specific configuration of the device 120 for driving a wireless charging pad is described with reference to FIGS. 5, 9, and 10.

Figure 2:
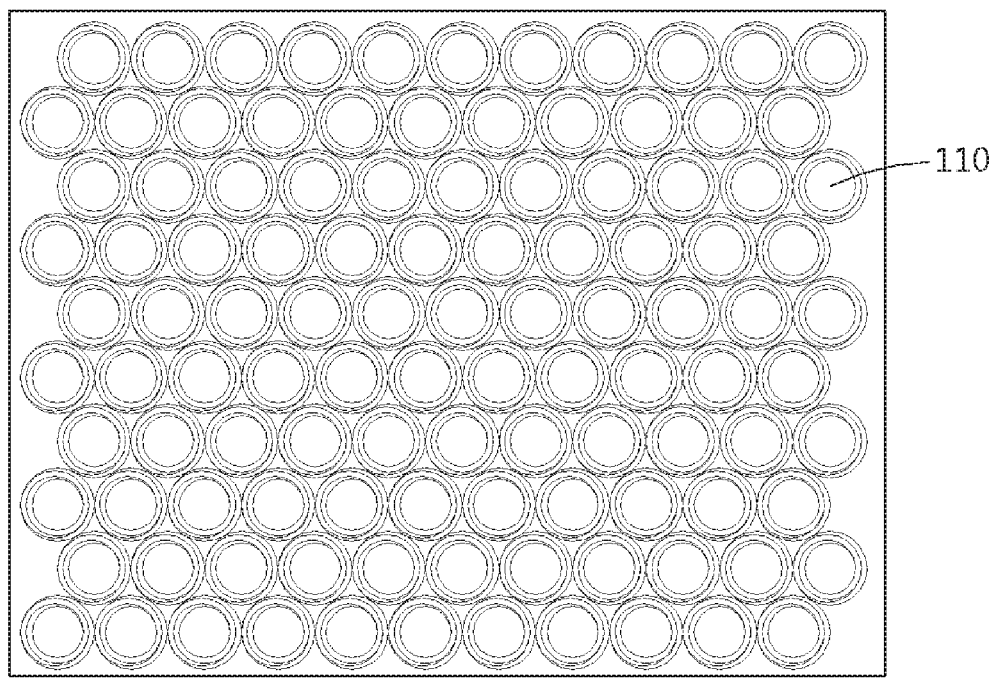
FIG. 2 is a drawing illustrating arrangement of power transmission coils on the wireless charging pad illustrated in FIG. 1.

FIG. 2 is a drawing illustrating arrangement of power transmission coils on the wireless charging pad illustrated in FIG. 1.

Referring to FIG. 2, the wireless charging pad 110 has a shape wherein the small power transmission coils are disposed in a tessellation structure thereon as described above, when viewed from above.

When the small power transmission coils are disposed as illustrated in FIG. 2, limitation on a charging location of a device to be charged may be reduced, compared to the case in which one large coil is disposed.

In addition, since only small power transmission coils corresponding to a position of a device placed on the wireless charging pad 110 are driven, charging efficiency may be constantly maintained regardless of a position of the device.

FIG. 3 is a drawing illustrating a constitution of a small power transmission coil according to an embodiment of the present disclosure.

Referring to FIG. 3, each of the small power transmission coils may be constituted of a circularly wound helical coil 301 and a ferrite core 302 located inside the helical coil 301.

Here, the helical coil 301 may be small in size. For example, the helical coil 301 may have a radius of 3 to 10 mm and a height of 10 to 20 mm.

Figure 4:
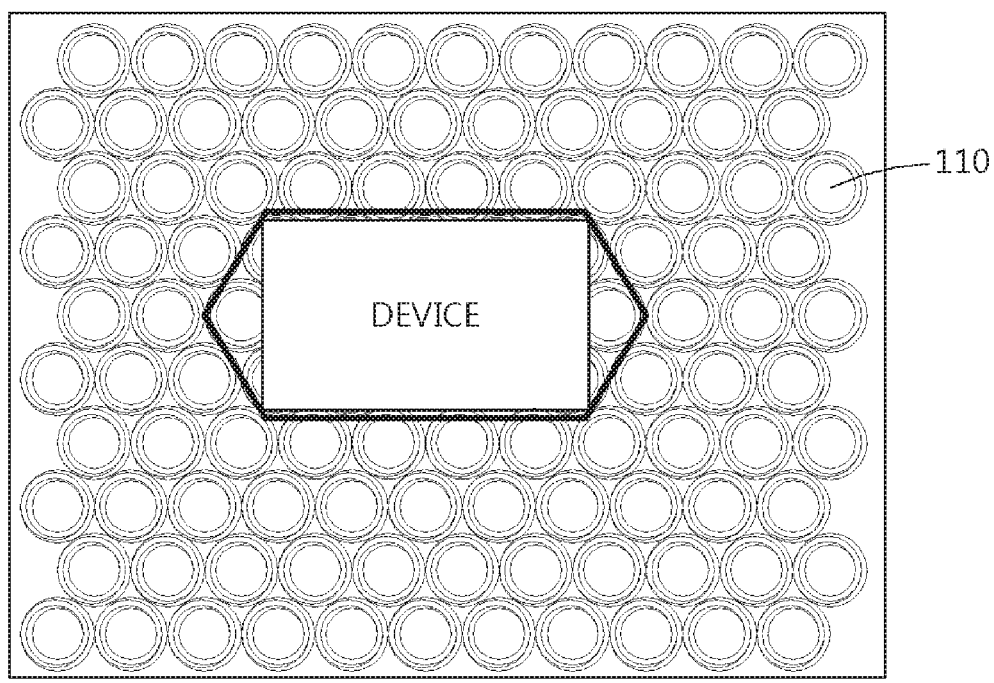
FIG. 4 is a drawing illustrating an embodiment of a device to be charged which is placed on the wireless charging pad illustrated in FIG. 1.

FIG. 4 is a drawing illustrating an embodiment of a device to be charged which is placed on the wireless charging pad illustrated in FIG. 1.

Referring to FIG. 4, "DEVICE," as an example of a device to be charged, i.e., is placed on the wireless charging pad 110.

Here, it may be controlled such that only small power transmission coils inside a hexagonal bold line inside which "DEVICE" is located, among a total of small power transmission coils, operate.

Figure 5:
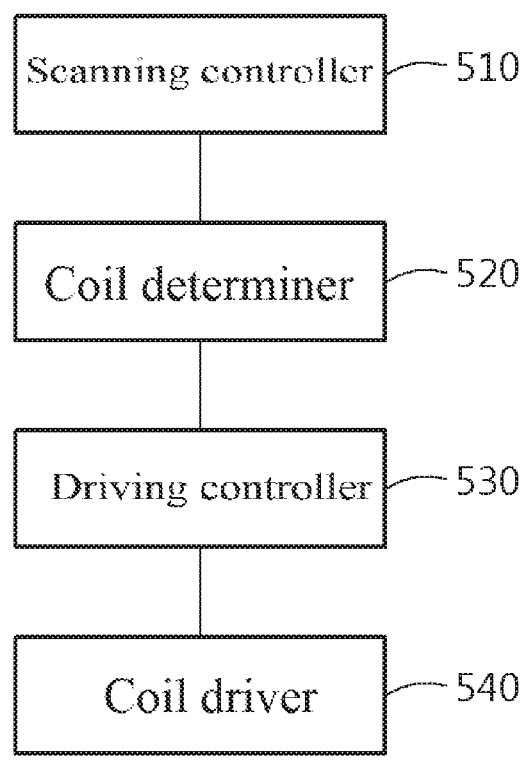
FIG. 5 is a drawing illustrating a constitution of a driving device of the wireless charging pad illustrated in FIG. 1.
Figure 6:
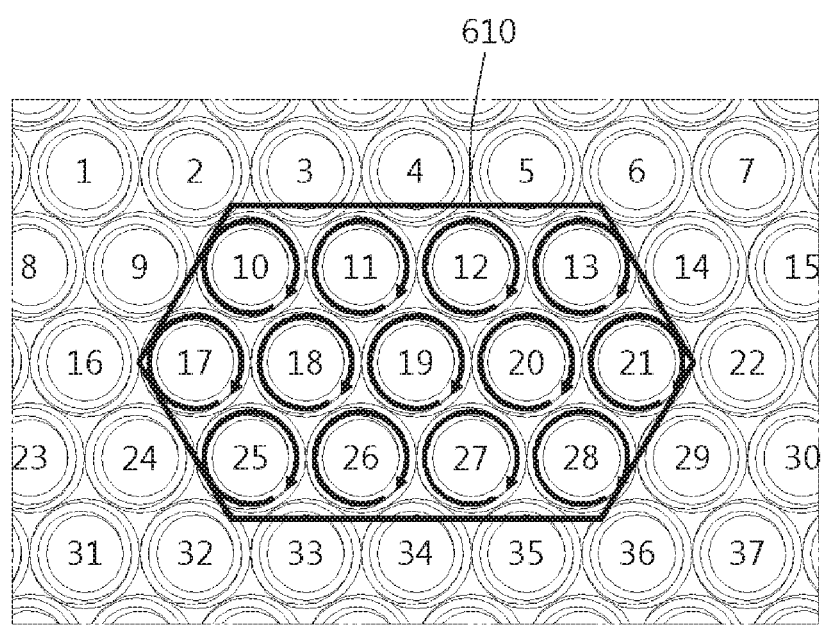
FIGS. 6 and 7 are drawings illustrating operation embodiments of the wireless charging pad when a device to be charged is placed on the wireless charging pad illustrated in FIG. 1.
Figure 7:
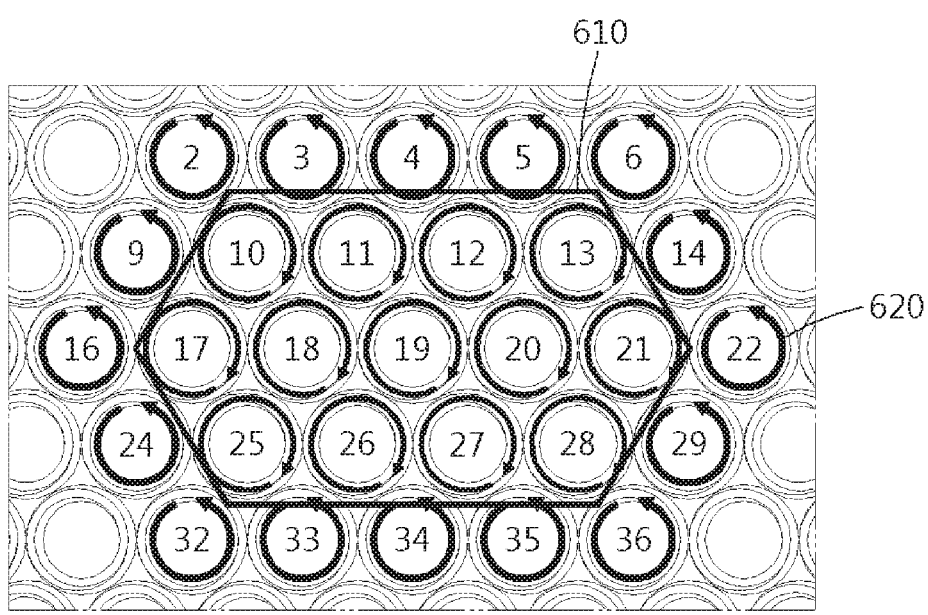
Figure 8:
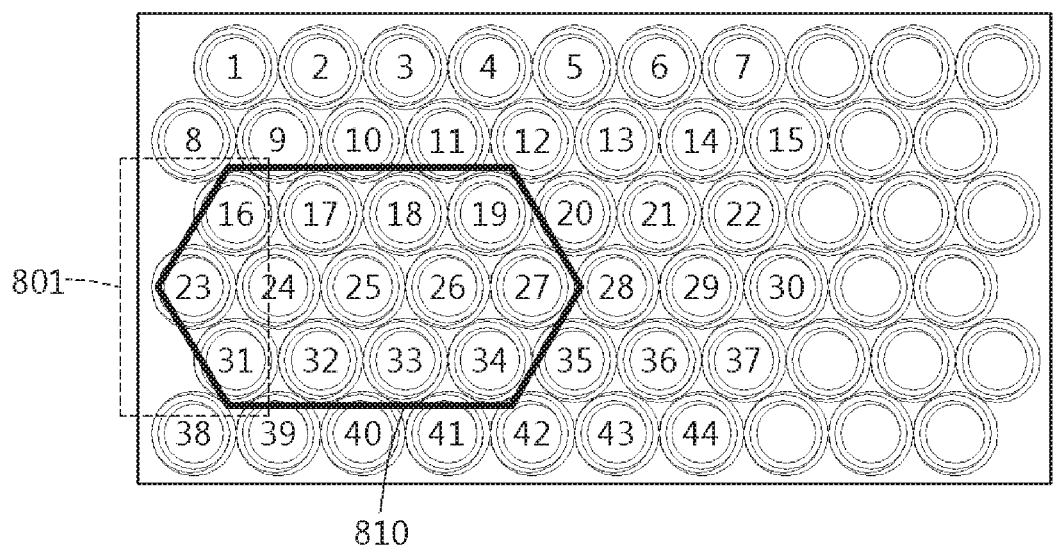
FIG. 8 is a drawing illustrating another operation embodiment of the wireless charging pad when a device to be charged is placed on the wireless charging pad illustrated in FIG. 1.

FIG. 5 is a drawing illustrating a constitution of a driving device of the wireless charging pad illustrated in FIG. 1. FIGS. 6 and 7 are drawings illustrating operation embodiments of the wireless charging pad when a device to be charged is placed on the wireless charging pad illustrated in FIG. 1. FIG. 8 is a drawing illustrating another operation embodiment of the wireless charging pad when a device to be charged is placed on the wireless charging pad illustrated in FIG. 1.

Referring to FIG. 5, the device 120 for driving a wireless charging pad includes a driving controller 530 and a coil driver 540. The device 120 for driving a wireless charging pad may further include a coil determiner 520 and a scanning controller 510.

The device 120 for driving a wireless charging pad according to an embodiment of the present disclosure may include the driving controller 530 configured to each independently control driving of the small power transmission coils constituting the wireless charging pad; and a plurality of driving modules configured to respectively drive the small power transmission coils according to a first or second control signal input from the driving controller 530. Hereinafter, a particular configuration example of the driving modules is described with reference to FIGS. 9 and 10.

The scanning controller 510 scans the wireless charging pad so as to detect a device to be charged on the wireless charging pad constituted of the small power transmission coils.

Here, the scanning controller 510 may detect whether a device to be charged is placed on corresponding small power transmission coils, using at least one of impedance change and pressure change in each of the small power transmission coils.

For example, upon scanning using impedance change, a device to be charged may be determined to be placed on corresponding coils when impedance change in the coils is out of a preset range.

In addition, when the small power transmission coils are respectively provided with pressure sensors, the pressure sensors may detect whether a device to be charged is placed on the pressure sensors, through pressure change.

For example, referring to FIG. 6, the scanning controller 510 may detect whether a device to be charged is placed on coils 10, 11, 12, 13, 17, 18, 19, 20, 21, 25, 26, 27, and 28 by scanning the wireless charging pad.

The coil determiner 520 investigates power transmission coils to be driven, which are located under the device to be charged, among the small power transmission coils, and investigates neighboring power transmission coils, which surround the power transmission coils to be driven, among the small power transmission coils.

For example, when coils under a position at which a device to be charged is placed are detected as coils 10, 11, 12, 13, 17, 18, 19, 20, 21, 25, 26, 27, and 28, as a result of scanning by the scanning controller 510, the coil determiner 520 may investigate that each of the coils 10, 11, 12, 13, 17, 18, 19, 20, 21, 25, 26, 27, and 28 is a power transmission coil to be driven.

In addition, the coil determiner 520 may investigate coils 2, 3, 4, 5, 6, 9, 14, 16, 22, 24, 29, 32, 33, 34, 35, and 36, among the small power transmission coils, as coils surrounding the power transmission coils to be driven 10, 11, 12, 13, 17, 18, 19, 20, 21, 25, 26, 27, and 28.

The driving controller 530 may generate a first control signal to apply a first driving voltage having a first phase to the power transmission coils to be driven, and may generate a second control signal to apply a second driving voltage, which has a phase different from the first phase, to the surrounding power transmission coils.

Here, the power transmission coils to be driven may be small power transmission coils matched to a device to be charged. The expression "matched to a device to be charged" may refer to being located under a device to be charged, or near the device to be charged to transmit power thereto.

For example, in FIGS. 6 and 7, clockwise arrows indicate a first phase, and counterclockwise arrows indicate a second phase.

Figure 9:
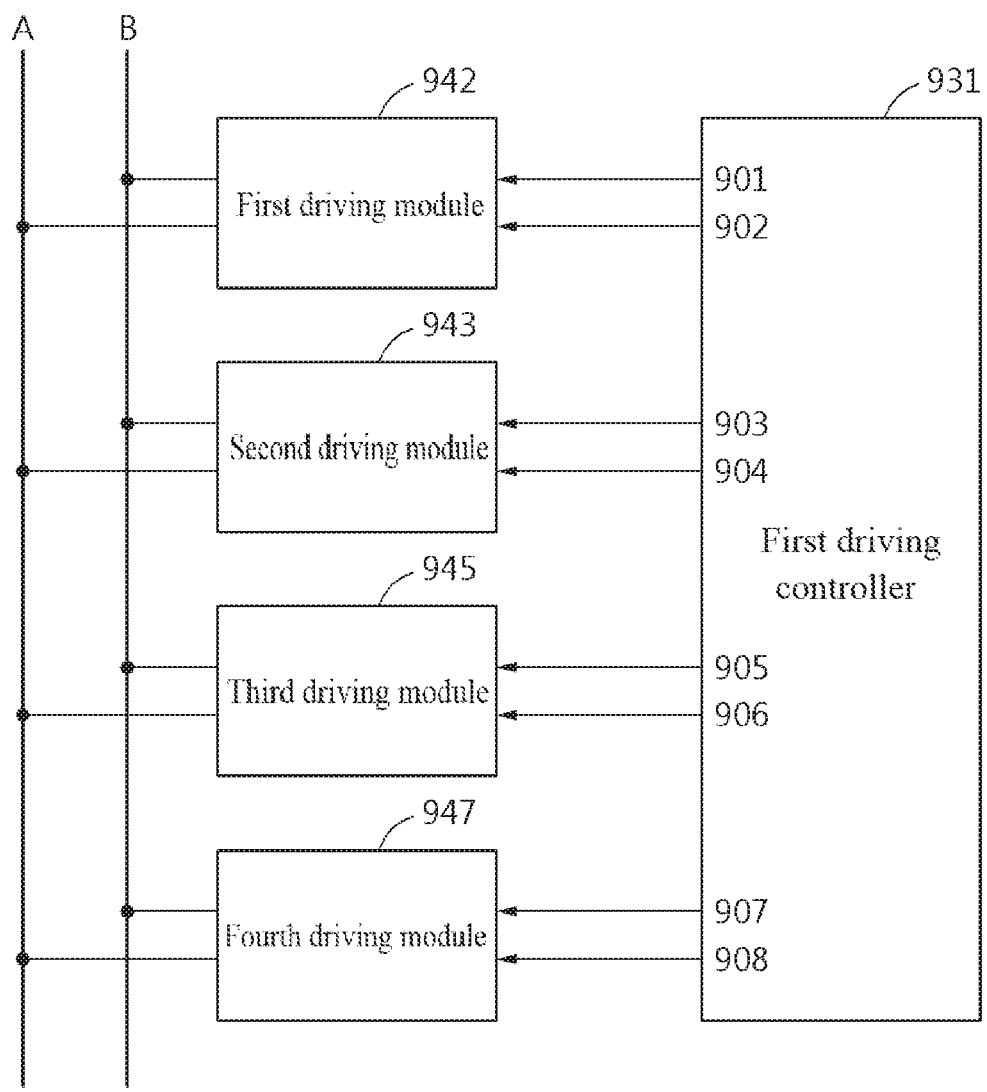
FIG. 9 is a drawing illustrating a configuration example of a driving controller and a coil driver illustrated in FIG. 5.
Figure 10:
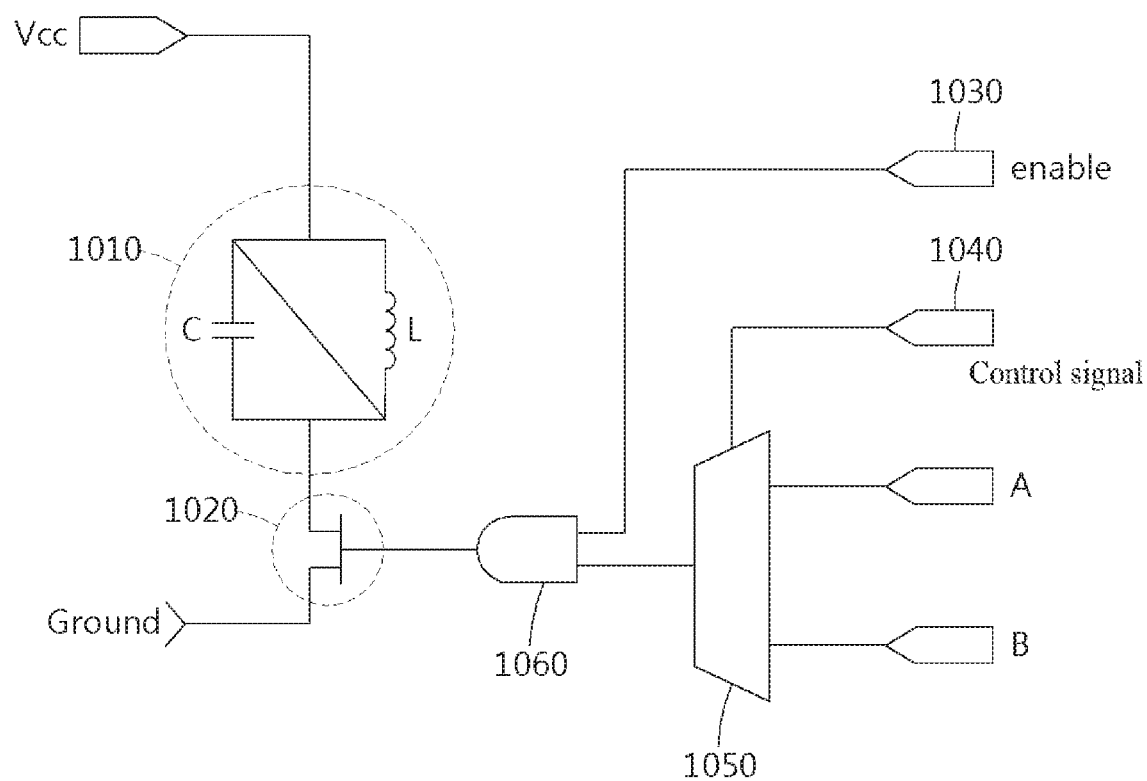
FIG. 10 is a drawing illustrating a configuration example of a coil driver and a connection relationship between a small power transmission coil and the coil driver according to an embodiment of the present disclosure.

Here, a first control signal may be a "select" signal controlling the coil driver 540 to select a signal "A" from among a signal "A" and a signal "B" having an opposite phase to the signal "A" in FIGS. 9 and 10.

In addition, a second control signal may be a "select" signal controlling the coil driver 540 to select a signal "B" from among a signal "A" and a signal "B" having an opposite phase to the signal "A" in FIGS. 9 and 10.

The coil driver 540 applies first and second driving signals to the wireless charging pad.

Here, the coil driver 540 may output the first driving signal to corresponding small power transmission coils upon receiving a first control signal, and may output the second driving signal to corresponding small power transmission coils upon receiving a second control signal.

For example, the coil driver 540 may output the first driving signal to each of power transmission coils to be driven 10, 11, 12, 13, 17, 18, 19, 20, 21, 25, 26, 27, and 28, and may output the second driving signal to each of surrounding power transmission coils 2, 3, 4, 5, 6, 9, 14, 16, 22, 24, 29, 32, 33, 34, 35, and 36.

By operating coils under a position at which a device to be charged is located in this manner, power is transmitted to the device to be charged. In addition, by operating coils near the coils, which are under a position at which the device to be charged is located, to have an opposite phase, magnetic force lines toward the device to be charged may increase, but magnetic force lines spreading to the outside may be reduced.

Accordingly, even when power transmitted to the device to be charged is increased, power transmission efficiency may be maintained and influence of magnetic field lines on the outside may be reduced.

Meanwhile, as illustrated in FIG. 8, a device to be charged may be placed on a portion, which includes an edge 801, of the wireless charging pad.

Referring to the embodiment illustrated in FIG. 8, each of coils 1 to 7, 8, 16, 23, 31, and 38 to 44 may have index information indicating that the coils are located at an edge of the wireless charging pad, and the coil determiner 520 may determine whether corresponding coils are located at an edge of the wireless charging pad through the index information.

Here, when a device to be charged is located at a position 810 illustrated in FIG. 8, coils 16 to 19, 23 to 27, and 31 to 34 may be determined as power transmission coils to be driven, as in the embodiment described with reference to FIGS. 6 and 7.

However, when coils 16, 23, and 31 are determined as power transmission coils to be driven, it may be impossible to effectively reduce spreading of magnetic force to the outside.

Here, when small power transmission coils located at an edge of the wireless charging pad are placed under a device to be charged, the coil determiner 520 may determine the small power transmission coils, which are located at the edge of the wireless charging pad, as surrounding power transmission coils.

For example, referring to the embodiment illustrated in FIG. 8, the coil determiner 520 may determine only coils 17 to 19, 24 to 27, and 32 to 34 as power transmission coils to be driven, and may determine coils 9 to 12, 16, 20, 23, 28, 31, 35, and 39 to 42 as surrounding power transmission coils.

FIG. 9 is a drawing illustrating a configuration example of a driving controller and a coil driver illustrated in FIG. 5.

FIG. 9 illustrates an embodiment wherein one driving controller (a first driving controller 931) controls four driving modules 942, 943, 945, and 947.

In other words, although not illustrated in FIG. 9, a plurality of driving controllers, such as second and third driving controllers, other than the first driving controller 931 may be provided.

Here, the first driving controller 931 may be a shift register having eight output signal terminals 901 to 908.

Accordingly, when first driving controllers 931, as shift registers, are connected in a cascade form, circuits for individually driving small power transmission coils may be linearly extended.

The driving modules 942, 943, 945, and 947 may be respectively connected to the small power transmission coils.

For example, the first driving module 942 may be connected to a first small power transmission coil, the second driving module 943 may be connected to a second small power transmission coil, the third driving module 945 may be connected to a third small power transmission coil, and the fourth driving module 947 may be connected to a fourth small power transmission coil.

Accordingly, when the wireless charging pad is provided with 36 small power transmission coils, the wireless charging pad may include 36 driving modules and 9 driving controllers.

Accordingly, a driving device for the wireless charging pad according to an embodiment of the present disclosure may include a first driving controller configured to each independently control driving of small power transmission coils constituting a first wireless charging module; and a second driving controller configured to each independently control driving of a plurality of small power transmission coils constituting a second wireless charging module.

Here, an end of the second driving controller may be connected to the first driving controller, and another end of the second driving controller may be connected to a third driving controller, thereby supporting expansion of the wireless charge modules.

Figure 14:
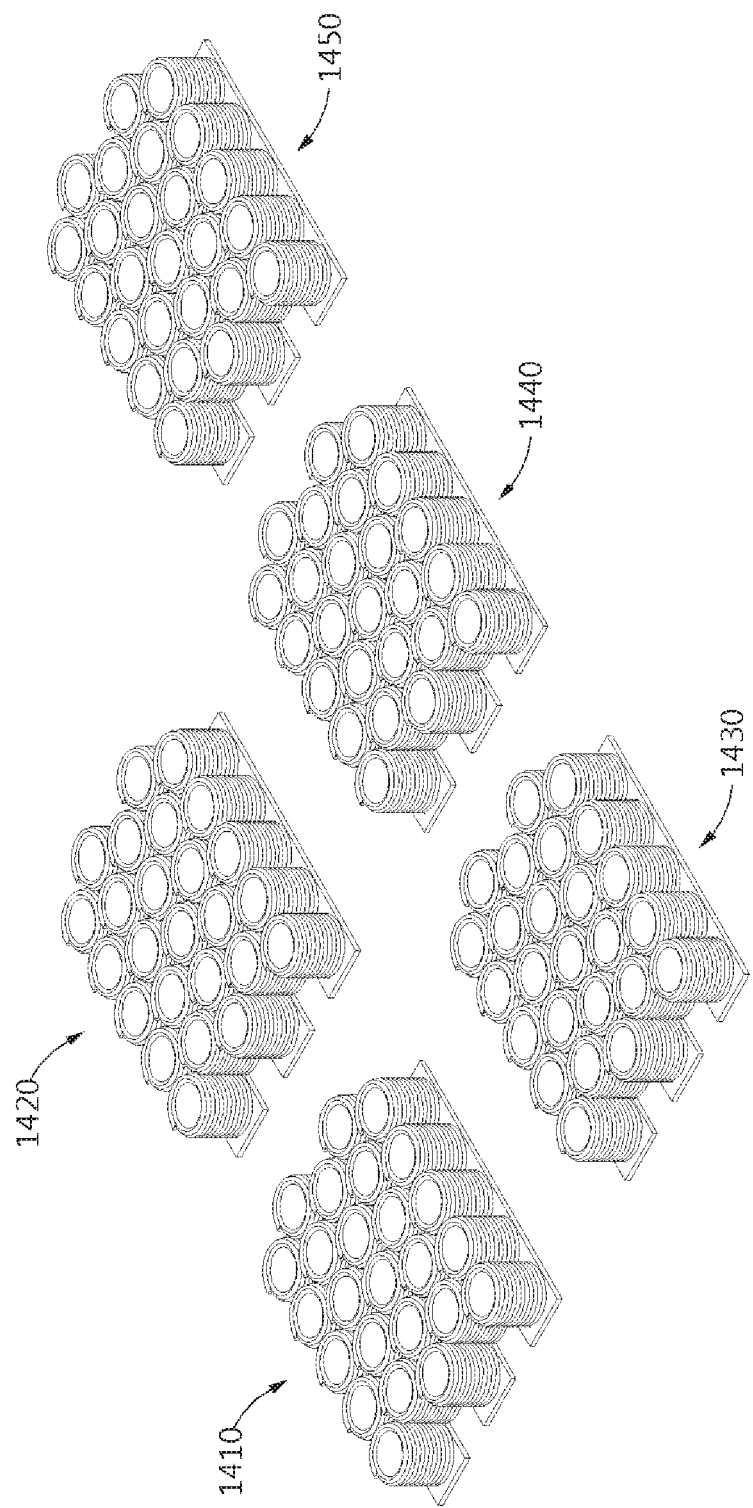
FIG. 14 is a drawing illustrating an embodiment of a modular wireless charging pad according to an embodiment of the present disclosure.

For example, upon connection of modules 1410, 1420, 1430, 1440, and 1450 illustrated in FIG. 14, simple module expansion may be accomplished by additionally providing a driving controller and a driver that are connected to each of the modules 1410, 1420, 1430, 1440, and 1450.

Referring to FIG. 9 again, the coil driver includes the driving modules 942, 943, 945, and 947 respectively connected to the small power transmission coils.

In addition, the coil driver may include two bus lines that respectively apply a first switching signal A having the first phase and a second switching signal B having the second phase to the driving modules 942, 943, 945, and 947.

Figure 11:
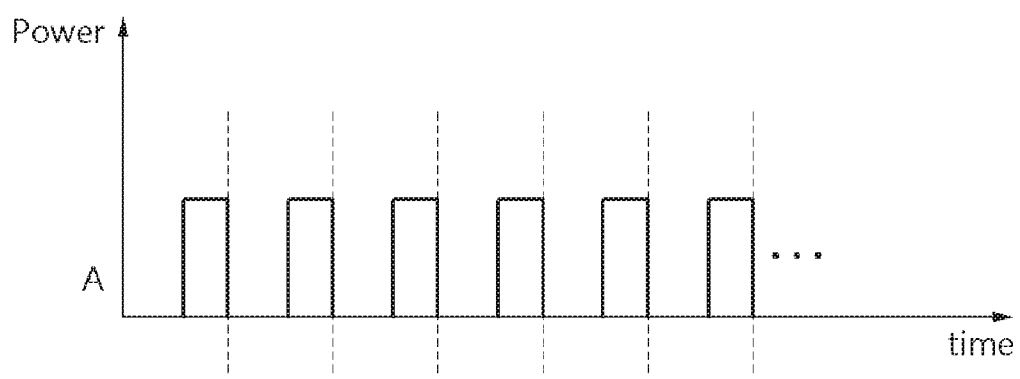
FIG. 11 illustrates exemplary drawings representing a phase relationship of signals A and B in FIGS. 9 and 10.
Figure 11:
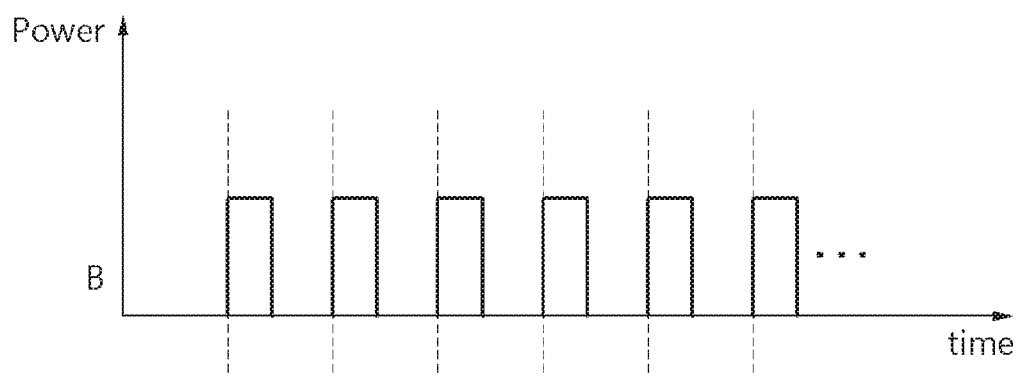

FIG. 11 is an exemplary drawing to describe a phase relationship between the first and second switching signals A and B of FIGS. 9 and 10. Here, phases of signals A and B may be, for example, opposite to each other.

The first driving controller 931 applies an enable signal and a first or second control signal, which control such that a corresponding driving module operates, to each of the driving modules.

The first driving controller 931 may apply an enable signal to driving modules respectively connected to the power transmission coils to be driven and the surrounding power transmission coils, and may apply the first or second control signal to the driving modules to which the enable signal is applied.

For example, when the first driving module 942 is a driving module connected to a power transmission coil to be driven, the enable signal may be output to a terminal 901, and the first control signal may be output to a terminal 902.

For example, when the fourth driving module 947 is a driving module connected to a surrounding power transmission coil, the enable signal may be output to a terminal 907, and the second control signal may be output to a terminal 908.

FIG. 10 is a drawing illustrating a configuration example of a coil driver and a connection relationship between a small power transmission coil and the coil driver according to an embodiment of the present disclosure.

Referring to FIG. 10, reference numeral 1010 denotes an equivalent circuit of one small power transmission coil.

One end of the small power transmission coil 1010 may be connected to a driving voltage Vcc, and another end thereof may be connected to a switching element 1020 provided in the coil driver.

Here, the coil driver may include the switching element 1020 connected to the small power transmission coil 1010; a multiplexer 1050; and an AND gate element 1060.

The coil driver may receive an enable signal through a terminal 1030 and may receive a control signal through a terminal 1040.

Here, the multiplexer 1050 may output the first switching signal A when a control signal, which is input through the terminal 1040, is a first control signal, and may output the second switching signal B when a control signal, which is input through the terminal 1040, is a second control signal.

The AND gate element 1060 may receive the enable signal, which is input through the terminal 1030, and an output signal of the multiplexer 1050 to control the switching element 1020.

For example, when the small power transmission coil 1010 is a power transmission coil to be driven, the first control signal may be input to the terminal 1040, and the switching element 1020 may be turned on/off by a switching signal such as signal A illustrated in FIG. 11.

The driving voltage Vcc is applied to the small power transmission coil 1010 according to on/off of the switching element 1020, so that the small power transmission coil 1010 operates as a first driving voltage having a first phase.

For example, when the switching element 1020 is an NMOS transistor, a capacitor of the small power transmission coil 1010 is charged in a time period in which the NMOS transistor is turned on, and is discharged in a time period in which the NMOS transistor is turned off. The magnetic field of an inductor may be controlled through repetition of such charge and discharge.

Figure 12:
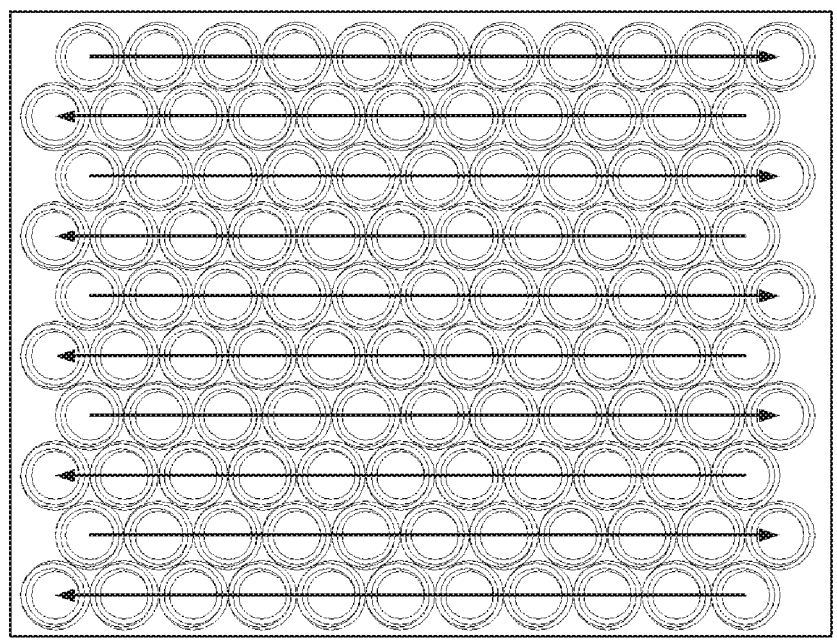
FIG. 12 illustrates exemplary drawings representing a scanning method of a wireless charging pad according to an embodiment of the present disclosure.
Figure 12:
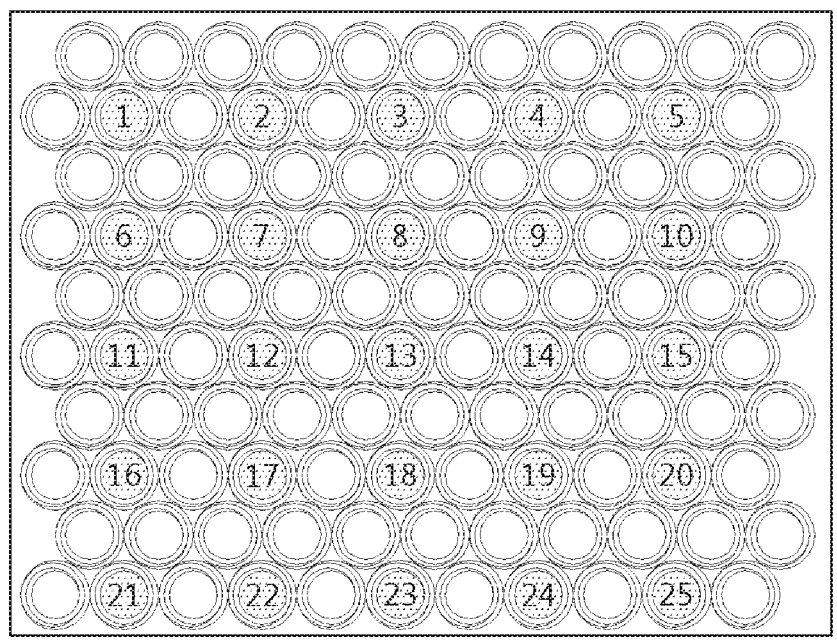

FIG. 12 illustrates exemplary drawings representing a scanning method of a wireless charging pad according to an embodiment of the present disclosure.

Referring to FIG. 12(*a*), the scanning controller 510 of FIG. 5 may respectively, sequentially scan the small power transmission coils.

In addition, referring to FIG. 12(*b*), the scanning controller 510 of FIG. 5 may sequentially scan a plurality of preset sample coils 1 to 25 among the small power transmission coils.

The scanning performed to detect on which coils of the wireless charging pad a device to be charged is placed may be carried out using various methods, other than the method illustrated in FIG. 12.

For example, although FIG. 12(*a*) illustrates sequential scanning performed in an arrow direction as an embodiment, the scanning may be performed in a direction opposite to the arrow direction. In addition, after scanning coils corresponding to left-to-right arrows, coils corresponding to right-to-left arrows may be subsequently scanned.

Figure 13:
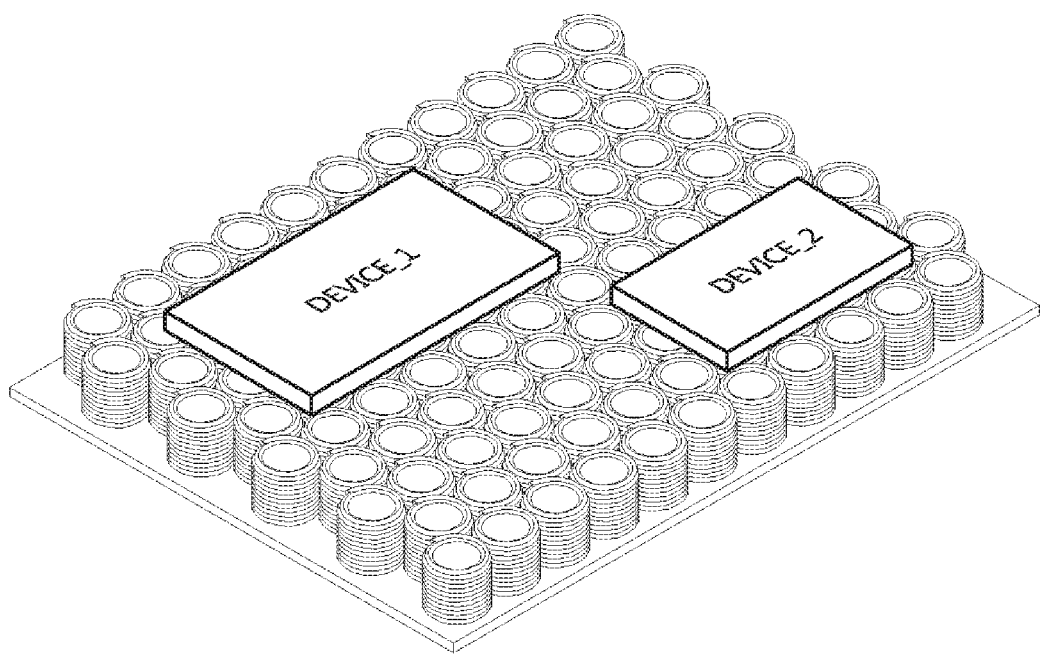
FIG. 13 is a drawing illustrating an operation example when a plurality of devices is placed on the wireless charging pad illustrated in FIG. 1.

FIG. 13 is a drawing illustrating an operation example when a plurality of devices is placed on the wireless charging pad illustrated in FIG. 1.

As illustrated in FIG. 13, a plurality of devices, i.e., "DEVICE 1" and "DEVICE 2," may be placed on the wireless charging pad.

Also when a plurality of devices to be charged, i.e., "DEVICE 1" and "DEVICE 2," is provided, small power transmission coils under "DEVICE 1" and "DEVICE 2" may be determined as power transmission coils to be driven, and coils surrounding the same may be determined as surrounding power transmission coils.

Accordingly, also when several devices are charged, the number of operating coils is limited, thereby preventing power loss to the outside.

FIG. 14 is a drawing illustrating an embodiment of a modular wireless charging pad according to an embodiment of the present disclosure.

As illustrated in FIG. 14, plural modules, e.g., modules 1410, 1420, 1430, 1440, and 1450, including the small power transmission coils, are connected to each other, a wireless charging pad may be extended as much as needed, and a wireless chargeable area may be expanded in various shapes.

Figure 15:
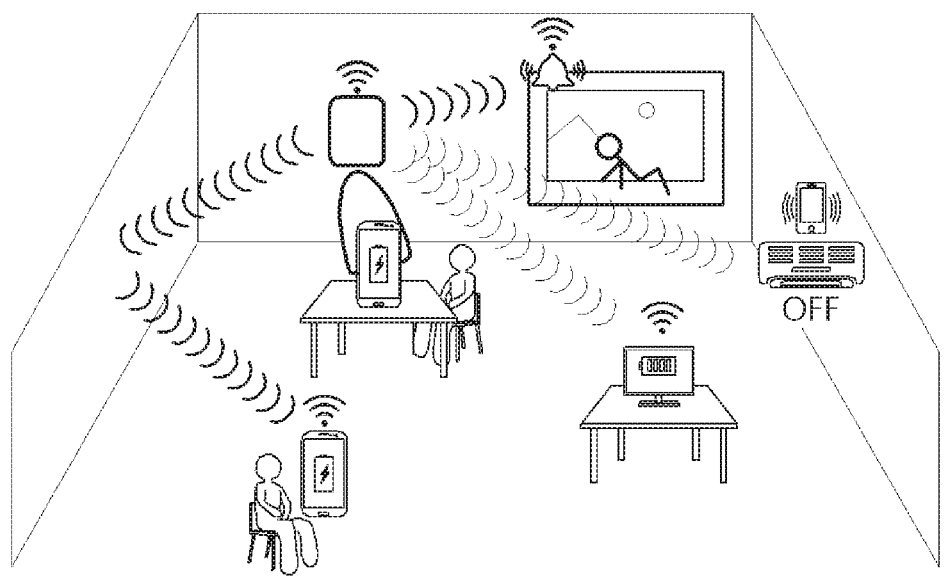
FIG. 15 is an exemplary drawing illustrating an environment to which a wireless power transmission system according to an embodiment of the present disclosure is applied.

FIG. 15 is an exemplary drawing illustrating an environment to which a wireless power transmission system according to an embodiment of the present disclosure is applied.

As illustrated in FIG. 15, a wireless power transmission environment may be a three-dimensional space such as a living room, a room, an office, an airport, or a train.

In a three-dimensional space, power transmission may be near-field wireless power transmission using a magnetic induction method or a magnetic resonance method. In addition, depending upon a location or type of a power reception apparatus, a microwave method capable of covering near and far distances may be used.

Meanwhile, the power reception apparatus may be a communication device, and a three-dimensional space may be provided with an RF harvesting device capable of collecting energy from electromagnetic waves.

Figure 16:
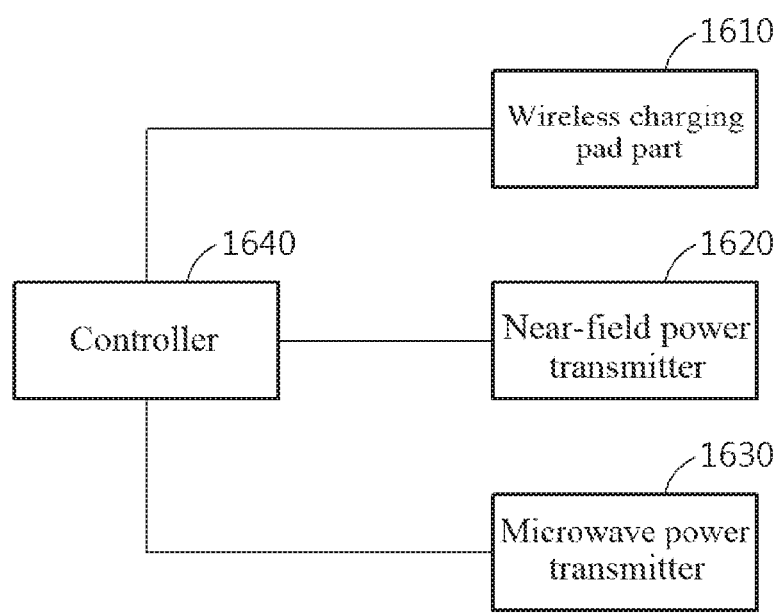
FIG. 16 is a drawing illustrating a wireless power transmission apparatus capable of transmitting power in various ways in the environment similar to that illustrated in FIG. 15.

FIG. 16 is a drawing illustrating a wireless power transmission apparatus capable of transmitting power in various ways in an environment similar to that illustrated in FIG. 15.

Referring to FIG. 16, the wireless power transmission apparatus may include at least one of a wireless charging pad part 1610, a near-field power transmitter 1620, and a microwave power transmitter 1630.

In other words, although FIG. 16 illustrates all of the wireless charging pad part 1610, the near-field power transmitter 1620, and the microwave power transmitter 1630, a power transmission apparatus using one power transmission method may be provided depending upon a three-dimensional space environment.

Accordingly, the wireless power transmission apparatus or power transmission apparatus in the present disclosure should be understood as including at least any one of the wireless charging pad part 1610, the near-field power transmitter 1620, and the microwave power transmitter 1630.

A controller 1640 may control operation of at least one of the wireless charging pad part 1610, the near-field power transmitter 1620, and the microwave power transmitter 1630.

The controller 1640 may monitor a three-dimensional space environment, and may control operation of at least one of the wireless charging pad part 1610, the near-field power transmitter 1620, and the microwave power transmitter 1630 based on the monitoring result.

For example, when remote transmission is unnecessary, the controller 1640 may perform control such that the wireless charging pad part 1610 and the near-field power transmitter 1620 operate, but the microwave power transmitter 1630 does not operate.

The wireless charging pad part 1610 may transmit power using a magnetic induction method or a magnetic resonance method.

Here, the wireless charging pad part 1610 may include the wireless charging pad constituted of a plurality of small power transmission coils and the driving device for the wireless charging pad, as described above with reference to FIGS. 1 to 14.

The near-field power transmitter 1620 may transmit power to a three-dimensional space using a magnetic resonance method.

The microwave power transmitter 1630 may transmit power to a three-dimensional space using a microwave power transmission method.

Meanwhile, a far field may be defined as a case where a distance between a transmitter and a receiver is "2×(antenna length)$^2$/wavelength" or more.

Figure 17:
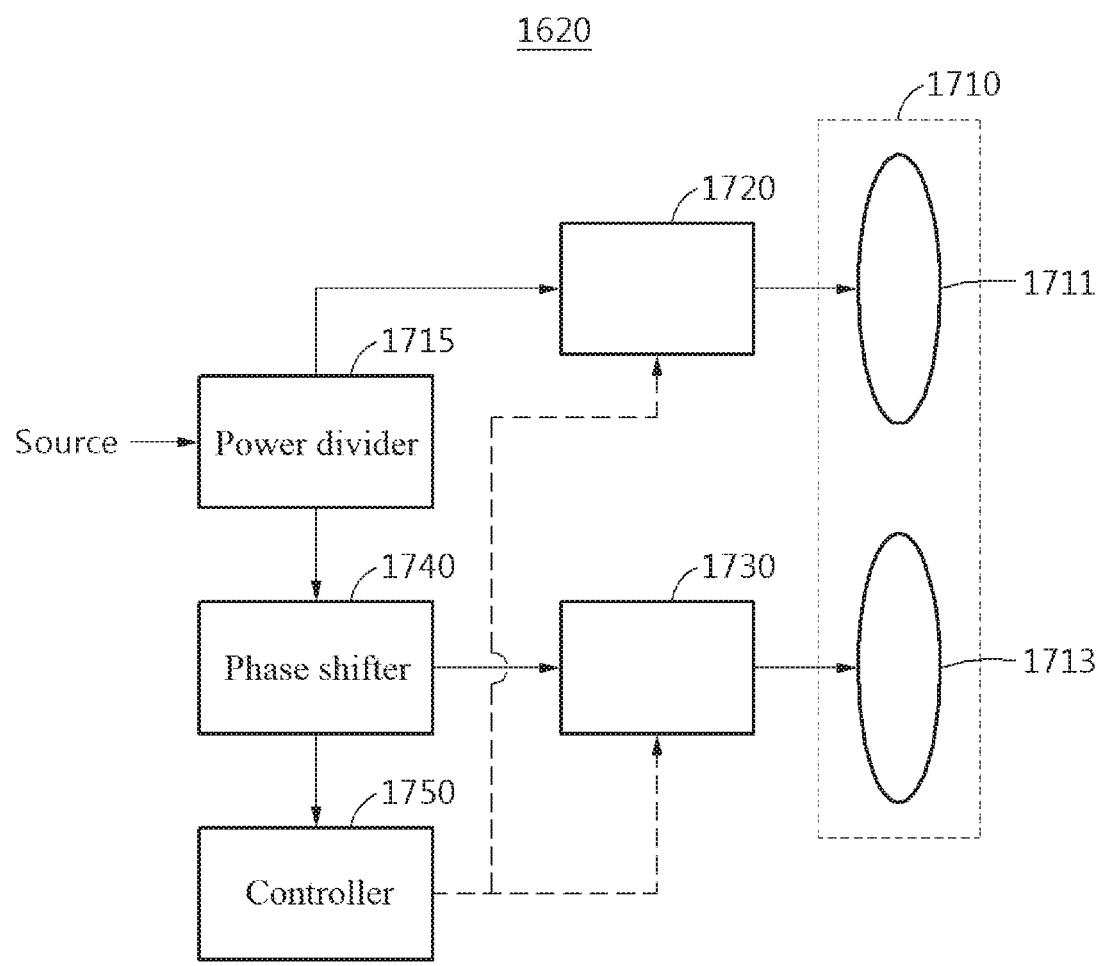
FIG. 17 is a drawing illustrating a configuration example of a near-field power transmitter illustrated in FIG. 16.

FIG. 17 is a drawing illustrating a configuration example of a near-field power transmitter illustrated in FIG. 16.

Referring to FIG. 17, the near-field power transmitter may include a coil part 1710 including a plurality of power transmission coils; a power divider 1715; a first amplifier 1720; a second amplifier 1730; a phase shifter 1740; and a controller 1750.

The coil part 1710 transmits wireless power to a reception coil using a magnetic resonance method.

For example, the coil part 1710 may include two magnetic resonance coils 1711 and 1713.

The first and second magnetic resonance coils 1711 and 1713 may respectively form magnetic coupling with a single reception coil, thereby wirelessly transmitting power.

Such an environment constituted of a plurality of transmission coils and a single reception coil may be referred to as a Multiple Input Single Output (MISO) system.

Meanwhile, an environment constituted of a single transmission coil or a single transmitter and a single reception apparatus may be referred to as a Single Input Single Output (SISO) system.

The MISO system may more efficiently transmit power, and may exhibit superior performance even in an environment in which a power reception apparatus moves, compared to the SISO system.

However, also in the MISO system, magnetic coupling may be greatly affected according to an arranged state of transmission coils and a reception coil.

When phases of currents supplied to the first magnetic resonance coil 1711 and the second magnetic resonance coil 1713 are differently controlled, magnetic coupling may be formed without being greatly affected by an arrangement state of the transmission coils and the reception coil.

The power divider 1715 may divide power from a power source and may output the divided power to the first amplifier 1720 and the phase shifter 1740.

The phase shifter 1740 may change a phase of input power.

The phase shifter 1740 may adjust a phase of a current supplied to the second amplifier 1730 by adjusting a phase of an input current.

Accordingly, phases of currents supplied to the first magnetic resonance coil 1711 and the second magnetic resonance coil 1713 may be differently adjusted.

For example, a difference between phases of currents supplied to the first magnetic resonance coil 1711 and the second magnetic resonance coil 1713 may be set to 0 to 180 degrees.

Through such phase control, an efficiency decrease problem caused by movement of a receiver in the MISO system may be addressed.

Figure 18:
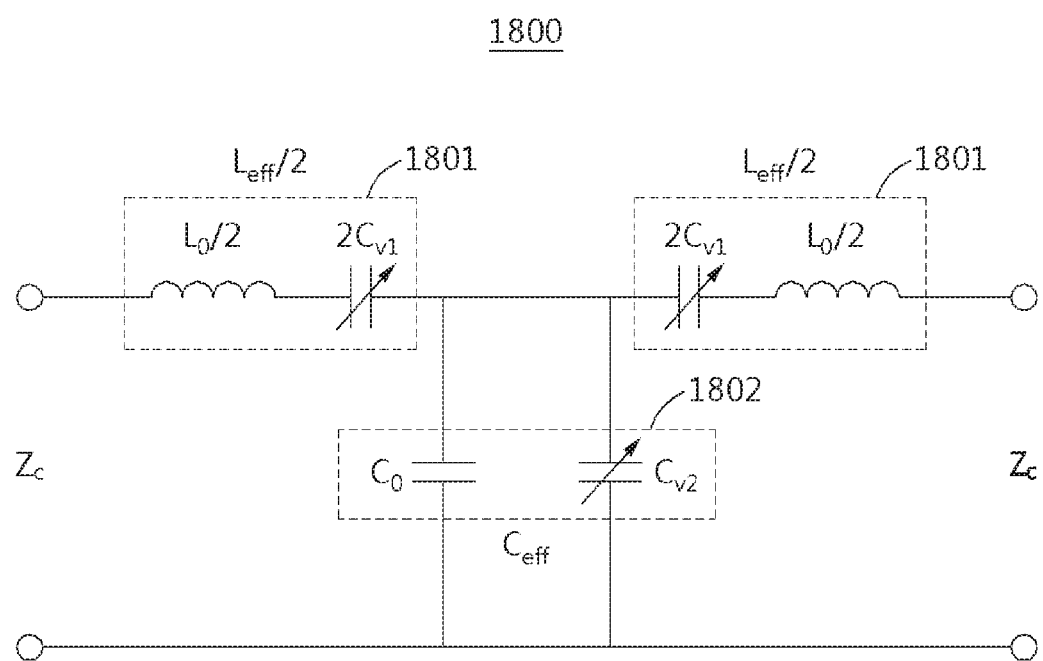
FIG. 18 is a drawing illustrating an embodiment of a phase shifter illustrated in FIG. 17.

FIG. 18 is a drawing illustrating an embodiment of a phase shifter illustrated in FIG. 17.

The wireless power transmission system according to the present disclosure may control a phase difference between two transmitters by dividing a signal of a transmission part into two powers through a power divider and then attaching a phase shifter 1800 to only one side thereof.

The phase shifter 1800 for adjusting a phase difference has too low a frequency band to be constituted in a general manner using the length of a line, which makes it difficult to increase a size. To address this problem, a structure illustrated in FIG. 18 may be used.

The wireless power transmission apparatus according to the present disclosure may divide power supplied from a power source, and may amplify the divided power having a first phase through a first amplifier. In addition, the wireless power transmission apparatus may adjust the divided power having the first phase to a second phase through a phase shifter, and then may amplify a power having a second phase through a second amplifier. In addition, the wireless power transmission apparatus may control the amplified power having the first phase and the amplified power having the second phase to be transmitted to a reception side through different resonant coils.

As illustrated in FIG. 18, the phase shifter 1800 may use variable capacitors to adjust the power having the first phase to have a second phase.

The phase shifter 1800 includes a serial transmission line part 1801 and a parallel variable capacitor part 1802.

In particular, the phase shifter 1800 may include a first variable capacitor ($2C_{v1}$) connected in series to an inductor ($L_0/2$) and a second capacitor ($2C_{v2}$) connected in parallel to a capacitor ($C_0$), as shown as drawing numeral 1801.

In addition, the power having the first phase divided using the first variable capacitor and the second variable capacitor may be phase-adjusted to have the second phase.

Here, a range of a phase shift may be determined according to a capacitance control range of the parallel variable capacitor part 1802.

The phase shifter 1800 is designed using a lumped element to also operate at low frequencies. In addition, the phase shifter 1800 has a wider phase shift width by simultaneously controlling inductors connected in series and capacitors connected in parallel through connection of variable capacitors in series and in parallel.

The shifted phase and power, which is output from the power divider, may generate different-magnitude powers through two power amplifiers, and then may supply the powers to the transmitter.

For example, through such a transmission manner, the sizes and phases of two transmitters may be arbitrarily adjusted. A controller of a reception part may investigate reception power and adjust load resistance and provide reception power information through communication with the controller of the transmission part, and the controller of the transmission part may control a phase and the magnitude of power based on the information.

The wireless power transmission apparatus according to the present disclosure may adjust load resistance of a reception part.

For example, in the case of MicroController Unit (MCU) communication between a transmitter and a receiver, alignment of the transmitter and the receiver may be disturbed, whereby efficiency may be decreased below a certain value. In this case, a state reaching maximum efficiency may be found by differently adjusting a phase difference and, additionally, by changing load resistance of the receiver in this state.

The controller according to an embodiment of the present disclosure may request that a reception side to control load resistance of the reception side in consideration of optimum load resistance allowing reception of maximum power. Here, the reception side may adjust load resistance by simultaneously controlling an inductor and a capacitor using a variable capacitor, or may adjust the load resistance through a selected matching circuit.

In another embodiment, the controller may request to adjust load resistance of the reception side at regular intervals so as to find a maximum efficiency state.

In yet another embodiment, the controller may adjust the load resistance of the reception side in consideration of both efficiency between a transmitter and a receiver and a constant cycle.

According to an embodiment of the present disclosure, a coupling coefficient between the receiver and the transmitter is changed according to an attitude of the receiver (an angle between the receiver and the transmitter) and a distance between the receiver and the transmitter, which changes optimal load resistance allowing reception of maximum power. Accordingly, other than control of a phase difference between the receiver and the transmitter and the magnitude of power, it is necessary to control the load resistance of the reception side. Therefore, a state in which a maximum efficiency is exhibited should be found while changing the magnitude and phase of the transmission part whenever the load resistance of the reception side changes.

The load resistance of the reception side may be implemented by adjusting input impedance through an LC matching circuit. For example, in the case of the reception side, a method of simultaneously controlling the LC using a variable capacitor, as in the phase shifter, is also possible. In addition, in the case of the reception side, several matching circuits may be selected and implemented, and a matching circuit may be selected through switching.

Figure 19:
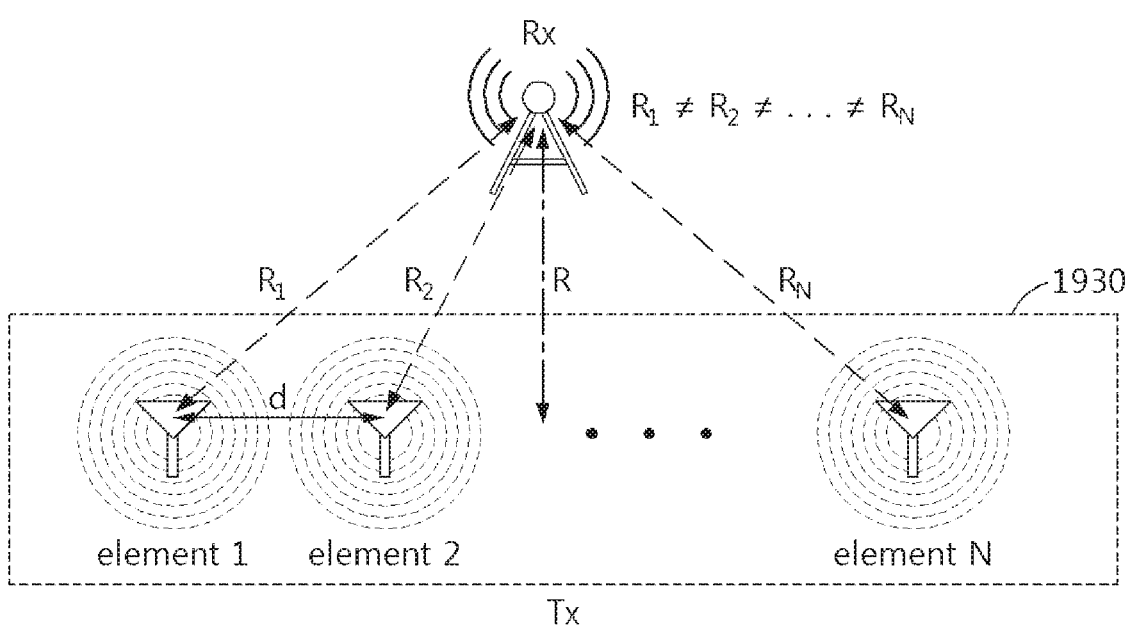
FIG. 19 is a drawing illustrating a configuration and operation environment of a microwave power transmitter illustrated in FIG. 16.

FIG. 19 is a drawing illustrating a configuration and operation environment of a microwave power transmitter illustrated in FIG. 16.

Referring to FIG. 19, the microwave power transmitter may include an array antenna part 1930 including a plurality of antenna elements (element 1, element 2, . . . element N).

The array antenna part 1930 may adjust radiation characteristics by controlling a phase and a magnitude of distribution current of each of the antenna elements.

Here, reception power may be maximized by adjusting a feeding phase of each radiation element so that the electric field is added in the same phase at a position of a reception antenna.

In general, a distance between an array antenna and a reception antenna is assumed to be very far. Accordingly, power transmission efficiency between the antennas may be calculated by applying the Friis formula represented by Equation 1, after assuming that a distance between each of the antenna elements of the array antenna and the reception antenna is equal:

$$\eta = \frac{P_r}{P_t} = \frac{G_t G_r}{\left(\frac{4\pi R}{\lambda}\right)^2} \quad \text{[Equation 1]}$$

wherein $P_r$ denotes reception power, $P_t$ denotes transmission power, R denotes a distance between the transmission antenna and the reception antenna, $G_t$ denotes a gain of the transmission antenna, and $G_r$ denotes a gain of the reception antenna.

However, the general Friis formula might not be applied to an environment for near-field or intermediate-distance wireless power transmission because a distance between each of the antenna elements of the array antenna and the reception antenna is different.

Accordingly, a controller 1540 or microwave power transmitter 1530 of FIG. 16 calculates power transmission efficiency considering an environment for actual wireless power transmission upon calculation of power transmission efficiency.

The controller 1540 or microwave power transmitter 1530 of FIG. 16 may receive information on reception power through communication with the power reception apparatus, and may calculate power transmission efficiency based on Equation 2 below. In addition, the controller 1540 may calculate power transmission efficiency from a near distance to a far distance based on Equation 2.

That is, when input power magnitudes of transmission radiation elements are respectively $P_1, P_2, \ldots, P_N$, distances between the reception antenna and the radiation elements are respectively $R_1, R_2, \ldots, R_N$, the radiation elements have the same gain, i.e., $G_{t0}$, and an antenna gain is $G_r$, power efficiency transmitted to the reception antenna may be represented by Equation 2:

$$\eta = \frac{P_{rec}}{P_{in}} = \frac{G_{t0} G_r}{\sum_{i=1}^{N} P_i} \left(\frac{\lambda_0}{4\pi}\right)^2 \left(\sum_{i=1}^{N} \frac{\sqrt{P_i}}{R_i}\right)^2 \quad \text{[Equation 2]}$$

wherein an average distance between a radiation element at a transmission end and a reception antenna may be defined by Equation 3. In addition, a power transmission efficiency calculation method according to an embodiment of the present disclosure may be represented by Equation 4:

$$R_{mean} = \frac{N}{\frac{1}{R_1} + \frac{1}{R_2} + \cdots \frac{1}{R_N}}, \left(R_{shortest} < R_{mean} < \frac{\sum_{i=1}^{N} R_i}{N}\right) \quad \text{[Equation 3]}$$

$$\eta = \frac{P_r}{P_t} = \frac{G_t G_r}{\left(\frac{4\pi R_{mean}}{\lambda}\right)^2} \quad \text{[Equation 4]}$$

As apparent from the above description, in accordance with the present disclosure, limitation as to charging position, a power loss problem, and a limitation on the number of maximally chargeable devices of existing wireless charging pads may be addressed.

More particularly, in accordance with an embodiment of the present disclosure, driving of an individual coil may be freely controlled, whereby coils may be expanded into a more efficient shape.

In addition, in accordance with an embodiment of the present disclosure, since phases of driving coils and coils near the driving coils may be reversely controlled, the magnetic field spreading to the outside may be reduced, thereby reducing harm to the human body. Accordingly, the magnitude of transmission power may be increased, compared to related technologies.

In addition, since the wireless charging pad of the present disclosure may be modularized, the wireless charging pad may be fabricated in various sizes. Further, when a module is added, a separate additional control circuit is unnecessary.

The aforementioned device may be realized by hardware component, a software component, and/or a combination of hardware and software components. For example, the device and components described in the embodiments may be realized using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or software applications that run on an operating system (OS). In addition, the processor may approach data, store, manipulate, and process the data, and generate new data by responding to running of software. Although one processor has been used to aid in understanding, those skilled in the art can understand that the processor may include a plurality of processing elements and/or a plurality of processing element types. For example, the processor may include a plurality of processors or a combination of one processor and controller. Further, another processing configuration, such as a parallel processor, may be applied.

Software may include a computer program, code, instructions, or a combination of one or more of the foregoing, and may configure a processing device to operate as desired or independently or collectively a command to a processing device. Software and/or data may be permanently or temporarily embodied in the form of any type of machines, components, physical devices, virtual equipment, computer storage media or devices, or a signal wave to be transmitted, so as to be interpreted by a processing device or to provide a command or date to a processing device. Software may be distributed over a networked computer system, and stored or executed in a distributed manner. Software and data may be stored on one or more computer readable media.

Embodiments of the present disclosure can include a computer readable medium including program commands for executing operations implemented through various computers. The computer readable medium can store program commands, data files, data structures or combinations thereof. The program commands recorded in the medium may be specially designed and configured for the present disclosure or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. For example, proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the disclosure to the embodiments disclosed, rather, the disclosure is to cover all modifications, equivalents, and alternatives falling within the spirit and scope of the disclosure as defined by the claims.

What is claimed is:

1. A wireless charging apparatus comprising a plurality of small power transmission coils, wherein the wireless charging apparatus comprises:
   a wireless charging pad including the plurality of small power transmission coils, wherein the plurality of small power transmission coils are arranged in a tessellation structure not to overlap on the wireless charging pad;
   a scanning controller configured to scan the plurality of small power transmission coils, wherein the scanning controller sequentially scans the plurality of small power transmission coils or sequentially scans a plurality of preset sample coils among the plurality of small power transmission coils;
   a coil determiner configured to determine target power transmission coils to be driven and positioned under a charging target device and power transmission coils surrounding the target power transmission coils among the plurality of small power transmission coils based on a scanning result of the scanning controller;
   a driving controller configured to generate a first control signal so as to apply a first driving voltage having a first phase to the target power transmission coils to be driven and generate a second control signal so as to apply a second driving voltage having a phase different from the first phase to the power transmission coils surrounding the target power transmission coils to be driven; and a coil driver configured to apply the first and second driving signals to the wireless charging pad, wherein a power transmission coil of the plurality of small power transmission coils is constituted of a circularly wound helical coil having a radius of 3 to 10 mm and a height of 10 to 20 mm and a ferrite core located inside the helical coil, wherein the plurality of small power transmission coils are configured to include the target power transmission coils to be driven and the power transmission coils surrounding the target power transmission coils, wherein the wireless charging pad is configured to be extended by connecting a plurality of driving modules configured to be respectively connected to the small power transmission coils, and wherein the small power transmission coils are configured to be linearly extended by connecting driving controllers, as shift registers, in a cascade form.

2. The wireless charging apparatus according to claim 1, wherein the coil driver comprises:

two bus lines configured to respectively apply a first switching signal having a first phase and a second switching signal having a second phase to the driving modules.

3. The wireless charging apparatus according to claim 2, wherein the driving controller applies an enable signal to the driving modules respectively connected to the target power transmission coils to be driven and the surrounding power transmission coils and apply the first or the second control signal to the driving modules to which the enable signal is applied, wherein each of the driving modules comprises:

a switching element connected to an end of a small power transmission coil having driving voltage connected to another end thereof;

a multiplexer configured to output the first switching signal when the first control signal is input and output the second switching signal when the second control signal is input; and an element configured to receive the enable signal and output of the multiplexer to control the switching element.

4. The wireless charging apparatus according to claim 1, wherein, when small power transmission coils located at an edge of the wireless charging pad are placed under the device to be charged, the coil determiner determines the small power transmission coils located at the edge of the wireless charging pad as power transmission coils surrounding the target power transmission coils among the plurality of small transmission coils.

5. A method of driving a wireless charging pad comprising a plurality of small power transmission coils arranged in a tessellation structure not to overlap on the wireless charging pad, the method comprising:

a coil scanning step of scanning the plurality of small power transmission coils, wherein the scanning sequentially scans the plurality of small power transmission coils or sequentially scans a plurality of preset sample coils among the plurality of small power transmission coils;

a coil driving determination step of determining target power transmission coils to be driven and positioned under a charging target device and power transmission coils surrounding the target power transmission coils to be driven among the plurality of small power transmission coils based on a result of the scanning;

a control signal generation step of generating a first control signal to apply a first driving voltage having a first phase to the target power transmission coils to be driven and generating a second control signal to apply a second driving voltage having a phase different from the first phase to the surrounding power transmission coils; and a driving signal application step of applying the first and second driving signals to the wireless charging pad, wherein a power transmission coil of the plurality of small power transmission coils is constituted of a circularly wound helical coil having a radius of 3 to 10 mm and a height of 10 to 20 mm and a ferrite core located inside the helical coil, wherein the plurality of small power transmission coils are configured to include the target power transmission coils to be driven and the power transmission coils surrounding the target power transmission coils, wherein the wireless charging pad is configured to be extended by connecting a plurality of driving modules configured to be respectively connected to the small power transmission coils, and wherein the small power transmission coils are configured to be linearly extended by connecting driving controllers, as shift registers, in a cascade form.

6. The method according to claim 5, wherein the driving signal application step comprises:

applying an enable signal to the driving modules respectively connected to the target power transmission coils to be driven and the surrounding power transmission coils and applying the first or second control signal to the driving modules to which the enable signal is applied;

outputting a first switching signal having the first phase when the first control signal is applied, and outputting a second switching signal having the second phase when the second control signal is input; and controlling a switching element connected to one end of a small power transmission coil having driving voltage connected to another end thereof using the enable signal and output of a multiplexer.

7. The method according to claim 5, wherein the coil driving determination step comprises determining, when small power transmission coils located at an edge of the wireless charging pad are placed under the device to be charged, the small power transmission coils located at the edge of the wireless charging pad as power transmission coils surrounding the target power transmission coils among the plurality of small transmission coils.

* * * * *